(12) United States Patent
Lammers et al.

(10) Patent No.: US 10,517,434 B2
(45) Date of Patent: Dec. 31, 2019

(54) COFFEE GRINDER AND COFFEE GRINDING METHOD

(71) Applicant: KONINKLIJKE PHILIPS N.V., Eindhoven (NL)

(72) Inventors: Jeroen Herman Lammers, Eindhoven (NL); Zhuangxiong Huang, Eindhoven (NL); Gerben Kooijman, Eindhoven (NL); Mart Kornelis-Jan Te Velde, Eindhoven (NL); Job Lipsch, Eindhoven (NL); Jan Frederik Suijver, Eindhoven (NL); Karel Johannes Adrianus Van Den Aker, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 676 days.

(21) Appl. No.: 15/035,247

(22) PCT Filed: Nov. 11, 2014

(86) PCT No.: PCT/EP2014/074233
§ 371 (c)(1),
(2) Date: May 9, 2016

(87) PCT Pub. No.: WO2015/071242
PCT Pub. Date: May 21, 2015

(65) Prior Publication Data
US 2016/0287016 A1 Oct. 6, 2016

(30) Foreign Application Priority Data

Nov. 12, 2013 (EP) ..................... 13192472

(51) Int. Cl.
*A47J 42/00* (2006.01)
*A47J 42/44* (2006.01)
(Continued)

(52) U.S. Cl.
CPC ................ *A47J 42/44* (2013.01); *A23F 5/08* (2013.01); *A47J 31/42* (2013.01); *A47J 42/36* (2013.01);
(Continued)

(58) Field of Classification Search
CPC .. A47J 42/00; A47J 42/38; A47J 42/44; A47J 42/46; A47J 42/56; A47J 31/42
See application file for complete search history.

(56) References Cited

U.S. PATENT DOCUMENTS 4,709,197 A * 11/1987 Goldhammer .......... B02C 13/30
241/36
4,812,691 A * 3/1989 Bertram .................. A47J 19/02
310/41
(Continued)

FOREIGN PATENT DOCUMENTS

CN 86103068 A 11/1987
CN 2550105 Y 5/2003
(Continued)

OTHER PUBLICATIONS

GR Series Coffee Grinders User's Guide—Food Equipment Technology Co., Sep. 5, 2008.
(Continued)

*Primary Examiner* — Faye Francis
(74) *Attorney, Agent, or Firm* — Schott, P.C.

(57) ABSTRACT

A coffee grinder having a grinding tool (20) for grinding coffee beans, a motor (30) for driving the grinding tool (20), a stall detector (41) for detecting a stall condition of the grinding tool (20) and/or of the motor (30), and a reversal unit (40) configured to temporarily reverse a direction of rotation (28,28') of the grinding tool (20) and/or of the motor (30) if the stall detector (41) detects a stall condition. Further, a corresponding coffee grinding method and a coffee machine having a coffee grinder are presented.

15 Claims, 4 Drawing Sheets

(51) Int. Cl.
    *A47J 42/38*    (2006.01)
    *A47J 31/42*    (2006.01)
    *A47J 42/36*    (2006.01)
    *A47J 42/40*    (2006.01)
    *A47J 42/46*    (2006.01)
    *A23F 5/08*     (2006.01)

(52) U.S. Cl.
    CPC ............... *A47J 42/38* (2013.01); *A47J 42/40* (2013.01); *A47J 42/46* (2013.01)

(56) References Cited

U.S. PATENT DOCUMENTS

| | | | |
|---|---|---|---|
| 5,217,108 | A | 6/1993 | Newnan |
| 5,241,898 | A | 9/1993 | Newnan |
| 6,901,846 | B2 | 6/2005 | Ruckstuhl |
| 6,988,444 | B1 | 1/2006 | Pfeifer |
| 7,448,563 | B2* | 11/2008 | Berger .................. B02C 18/16 241/30 |
| 7,984,868 | B2 | 7/2011 | Anson |
| 2007/0187534 | A1 | 8/2007 | Anson |
| 2015/0122131 | A1 | 5/2015 | Te Velde et al. |

FOREIGN PATENT DOCUMENTS

| | | |
|---|---|---|
| CN | 1846585 A | 10/2006 |
| CN | 101377523 A | 3/2009 |
| CN | 102327062 A | 1/2012 |
| EP | 1707089 A1 | 10/2006 |
| EP | 2030539 A1 | 3/2009 |
| EP | 2153758 A1 | 2/2010 |
| FR | 1215254 A | 4/1960 |
| GB | 488084 A | 6/1938 |
| GB | 2463900 A | 3/2010 |
| JP | 03193012 A | 8/1991 |
| JP | 2004-524902 A | 8/2004 |
| JP | 2010234272 A | 10/2010 |
| WO | 2010/018060 A1 | 2/2010 |
| WO | 2013/160825 A2 | 10/2013 |

OTHER PUBLICATIONS

Office Action issued in application No. 14796755.8, dated Feb. 5, 2019 14 pages.

English Translation and Office Action issued in connection with corresponding application No. 2014800619931 dated Feb. 27, 2018, 17 pages.

English Translation and Office Action issued in connection with corresponding application No. 2016-529882 dated Aug. 31, 2018, 10 pages.

English Translation and Notice of Allowance issued in connection with corresponding application No. 2016123155 dated Jun. 18, 2018, 21 pages.

English Translation and Office Action issued in connection with corresponding application No. 201480061993.1 dated Jan. 9, 2019, 16 pages.

English Translation and Notice of Allowance issued in connection with corresponding application No. 2016-529882 dated May 28, 2019, 5 pages.

* cited by examiner

COFFEE GRINDER AND COFFEE GRINDING METHOD

This application is the U.S. National Phase application under 35 U.S.C. § 371 of International Application No.PCT/EP2014/074233, filed on Nov. 11, 2014, which claims the benefit of International Application No. 13192472.2 filed on Nov. 12, 2013. These applications are hereby incorporated by reference herein.

FIELD OF THE INVENTION

The present invention relates to a coffee grinder. The present invention further relates to a coffee grinding method and a coffee machine comprising the coffee grinder.

BACKGROUND OF THE INVENTION

A coffee grinder is a device for grinding coffee beans, for example, for brewing coffee. A coffee grinder comprises a grinding tool for grinding coffee beans and a motor for driving the grinding tool. A coffee grinder can be a stand-alone device or integrated, for example, in a fully-automated coffee machine as commercially available by the applicant.

U.S. Pat. No. 7,984,868 discloses a coffee grinder with two grinding burrs. One of the grinding burrs is driven by a motor, whereas the other burr is static. The two grinding burrs are provided with grinding surfaces against which coffee beans are ground. The grinding surfaces are spaced a desired dimension away from each other to produce a desired grind of coffee. A closer separation of the grinding surfaces results in finer coffee whereas a larger separation results in coarser coffee grind. Adjustment means are provided for automatically adjusting the separation of the burrs relative to each other.

A possible failure condition occurs if the coffee grinder is blocked by jammed beans, bean particles or coarse grind. The coffee grinder stalls. Such a stall condition can be detected as described in EP 2 030 539 A1 which discloses a method for counting the number of revolutions of a burr of a coffee mill. EP 2 030 539 A1 teaches to consequently shut of the motor before it is damaged but does not provide a solution to overcome the stall condition.

As a solution EP 0 616 502 B1 suggests the use of a grinder motor of sufficient grinding power to overcome this problem by brute force. A disadvantage of this solution is that a powerful motor is heavy, bulky and/or expensive.

As an alternative solution, the operating manual of the WMF5 coffee grinder teaches to manually adjust the grinding degree to a coarser setting, i.e., to increase the separation of the grinding surfaces. Thereby, the jammed beans are released. After increasing the separation, the user has to clear the grinder, manually readjust the desired grinding degree and can then resume grinding operation. A disadvantage of this solution is that it requires manually adjusting the separation of the burrs and clearing the coffee grinder which is a tedious and time-consuming process.

GB 488 084 A discloses that an electric motor driving a coffee grinder has its rotor mounted freely on its shaft to which it is connected by a spring which tends to move the rotor relative to the shaft into an initial position beyond which it is prevented from moving. The movement of the rotor with respect to the shaft in the reverse direction is also limited so that on starting the rotor takes up the shaft with an impact, and on stopping the rotor is moved back on the shaft by the spring and gives the shaft an impact in reverse direction. GB 488 084 A teaches to clear the coffee grinder after the grinding process as a preventive measure to facilitate re-starting.

EP 1 707 089 A1 discloses a method for detecting a lack of coffee beans in a coffee grinder by evaluating a level and/or spectrum of vibrations caused by the coffee grinder during operation.

FR 1 215 254 A discloses an automatic control for home appliances such as coffee grinders to provide automatic shutdown.

EP 2 153 758 A1 discloses a method for determining the load of a mill, wherein the state of the mill is derived from the revolution speed of the mill. The revolution speed can be measured e.g. using a Hall sensor. If the mill is blocked the motor driving the mill can be stopped the user can be requested to remove the blockage.

GB 2 463 900 A discloses a coffee dispensing apparatus having a grinding mechanism. In the event that the grinder becomes jammed during a grinding operation, a drive dog of the grinder will stop rotating. The motor driving the grinder will be decoupled from the grinder by a clutch. The motor is then stopped and an alert may be generated to advise the user that the grinder has become jammed.

SUMMARY OF THE INVENTION

It is an object of the present invention to provide a coffee grinder which overcomes the problem of stalling while at the same time being light, small and/or less expensive as well as convenient to use.

In a first aspect of the present invention a coffee grinder is presented that comprises:
  a grinding tool for grinding coffee beans,
  a motor for driving the grinding tool,
  a stall detector for detecting a stall condition of the grinding tool and/or of the motor, and
  a reversal unit configured to temporarily reverse a direction of rotation of the grinding tool and/or of the motor if the stall detector detects a stall condition.

In a further aspect of the present invention a coffee machine is presented that comprises the afore-mentioned coffee grinder.

In a still further aspect of the present invention a coffee grinding method is presented that comprises the steps of:
  detecting a stall condition of a grinding tool for grinding coffee beans and/or of a motor for driving the grinding tool, and
  temporarily reversing a direction of rotation of the grinding tool and/or of the motor if the stall condition of the grinding tool and/or of the motor is detected.

Preferred embodiments of the invention are defined in the dependent claims. It shall be understood that the claimed coffee machine and coffee grinding method have similar and/or identical preferred embodiments as the claimed coffee grinder and as defined in the dependent claims.

The present invention is based on the idea that temporarily reversing a direction of rotation of the grinding tool and/or of the motor can overcome a stall condition wherein the coffee grinder is blocked by jammed beans, bean particles or coarse grind. In a first aspect, a temporary reversal of the direction of rotation of the grinding tool causes a rearrangement of the coffee beans in the coffee grinder which has positive impact on the torque profile required to drive the grinding tool. The torque required to drive the grinding tool in reverse direction of rotation is lower than the forward torque, thus a low-power motor can perform this task. A temporary reversal of the direction of rotation of the grinding tool is preferably effected by reversing the direction of rotation of the motor for driving the grinding tool.

In a second aspect, a temporary reversal of the direction of rotation of the motor, wherein the motor is not rigidly coupled to the grinding tool, enables the motor to turn back with respect to the grinding tool without reversing the direction of rotation of the grinding tool. The motor then resumes its previous direction of rotation and gains momentum before driving the grinding tool again. The momentum of the motor, and optionally of further elements of the drive train, provides extra force to overcome the stall condition. This can also be described as a hammering motion to overcome the stall condition. Optionally both aspects, i.e., rearranging the beans and hammering, are combined to overcome the stall condition.

In other words, the grinding tool and/or the motor are configured to rotate in a first direction of rotation during the grinding process. If the stall detector detects a stall condition, the reversal unit is configured to change the direction of rotation of the grinding tool and/or the motor from the first direction of rotation to a second direction of rotation, wherein the second direction of rotation has an opposite sense of rotation than the first direction of rotation.

An advantage of the present invention is that the grinding degree, i.e. the fineness or coarseness of the coffee grind, does not have to be changed. Thus, the coffee grinder can continue operation after a temporary reversal with the same grinding degree.

As a further advantage, a lighter, smaller and potentially less expensive motor can be used. The present invention is particularly advantageous for novel types of coffee grinders having a limited motor power and operating at high rotation rates of the grinding tool. Since the power of a motor is given by the torque times the rotation rate, the limitation of power in combination with high rotation rates of the grinding tool also mean that the torque for driving the grinding tool is limited. In conventional coffee grinders, a gearing having a gearing ratio of 1:40 between motor and grinding tool is often used. A high gearing ratio can provide sufficient torque at the grinding tool that a stall condition does not occur. However, a gearing is expensive, bulky and inefficient in energy. It would thus be advantageous to use no gearing at all or a light, compact and less expensive gearing, for example having a much lower gearing ratio of, for example, 1:7, 1:5, or even 1:3.

As used herein, the term "grinding tool" or grinding mill refers to an element configured to reduce the size of coffee beans preferably by a rotary movement such as a movable grinding burr which is configured to interact with a second grinding burr to reduce the size of coffee beans. The optional second grinding burr can be static. Further, the term "grinding tool" refers to a grinding tool having an abrasive surface, wherein the coffee beans and the abrasive surface are made to contact each other and to perform a relative movement with respect to each other, such that the coffee beans are ground off bit by bit by a grinding or scraping movement. Blade grinders are a further alternative.

As used herein, the term "stall condition" refers to a state wherein the coffee grinder is blocked by jammed beans, bean particles and/or coarse grind, in particular a state wherein the grinding tool comes to a complete stop. Further, the term "stall condition" refers to a condition wherein a torque required to operate the grinding tool of the coffee grinder exceeds a predetermined threshold but not yet coming to a complete stop. This may cause an overheating of the motor for driving the grinding tool. In an embodiment, the condition is evaluated and used to prevent an overheating of the motor driving the grinding tool.

As used herein, the term "coffee grinder" is used as a class terminology also comprising grinders for grinding other beans, grains or seeds such as soy beans or poppy seeds. Further, the grinder can be configured to receive and further reduce the size of coarse grind, thus of an intermediate product. The same applies for the expression "grinding tool for grinding coffee beans".

According to a preferred embodiment, the reversal unit comprises a controller for controlling a direction of rotation of the motor. Thereby, the motor can be actively turned back by the reversal unit. If the grinding tool and the motor are rigidly coupled, this also reverses a direction of rotation of the grinding tool. Thus, the drive train from the motor to the grinding tool is configured for reversal. An advantage of this embodiment is that it can be implemented as an all electronic solution without the need for additional mechanical elements.

In an embodiment, the reversal unit comprises a spring-loaded clutch. The spring-loaded clutch is arranged between the motor and the grinding tool. Optionally, the connection of grinding tool and motor further comprises a gearing. The clutch can then be arranged either between the motor and the gearing or between the gearing and the grinding tool. The spring-loaded clutch is an element that provides a non-static connection between motor and grinding tool, the connection optionally comprising a gearing, wherein a spring element is configured to store energy for temporarily reversing a direction of rotation of the motor. For example, the stall detector detects a stall condition of the grinding tool and in consequence interrupts the power supply to the motor for driving the grinding tool. Thereby, the motor does not exert a driving force and torque on the grinding tool. The motor is in a free-running mode, wherein the motor can be easily turned back by the energy stored in the loaded spring of the clutch. It should be noted that it is not mandatory to temporarily reverse a direction of rotation of the grinding tool. It can be sufficient to temporarily reverse a direction of rotation of the motor. Upon restarting the motor, the spring of the clutch winds up, and the motor gains angular momentum. This angular momentum of the motor provides the extra energy needed for overcoming the stall condition of the grinding tool.

In an embodiment, the reversal unit is further configured to resume a preferred direction of rotation after the direction of rotation has been reversed. Thus, the coffee grinder can resume its regular operation after reversing the direction of rotation for overcoming a stall condition. The term "preferred direction of rotation" as used herein describes the direction of rotation used for grinding. In other words, the reversal unit is configured to temporarily change the direction of rotation from a first direction of rotation to a second direction of rotation with opposite sense of rotation and after that again change the direction of rotation from the second direction of rotation to the first direction of rotation.

In an embodiment, the reversal unit is configured to control a sequence of pausing the rotation of the grinding tool and/or of the motor if the stall detector detects the stall condition, reversing a direction of rotation of the grinding tool and/or of the motor, pausing the reverse rotation of the grinding tool and/or of the motor, and resuming a preferred direction of rotation of the grinding tool and/or of the motor. Pausing the rotation of the grinding tool if the stall detector detects the stall condition has the advantage that the motor is allowed to cool down. A stall condition either causes a complete stop or significant slowing down of the motor, which typically involves an increased blocking or stall current. This can cause a temperature increase of the motor. Advantageously, the rotation of the grinding tool and of the motor is paused for the predetermined amount of time. After having reversed the direction of rotation, the rotation can optionally be paused again before the grinding tool and/or the motor resume operation in the preferred direction of rotation.

In an embodiment, the stall detector is configured to evaluate an electrical current of the motor for detecting the stall condition. An advantage of this embodiment is that it is a simple and potentially inexpensive solution for detecting the stall condition. Optionally, the stall detector is implemented as a part of the controller of the reversal unit.

In a further embodiment, the stall detector is configured to evaluate a rotation rate of the grinding tool and/or of the motor for detecting the stall condition. For example, the rotation rate of the grinding tool can be detected by a hall sensor arranged in proximity to the grinding tool and a magnet arranged in the grinding tool. Alternatively, or in addition, a spectrum of an electrical supply of the motor can be evaluated, wherein the spectrum indicates a periodic switching of commutator contacts of the motor. In other words, the motor rotation speed can be measured by detecting high frequency components in the motor current signal that relate to the periodic switching of the commutator contacts. Alternatively, the DC motor current (DC motor) or RMS current (AC motor) can be measured to deduce the rotation speed, if the motor characteristic is known. Alternative sensing means such as, for example an optical, inductive or capacitive sensor, can be used.

In a further refinement of the afore-mentioned embodiments, the evaluation for detecting the stall condition comprises comparing a detected value with a threshold value and/or comparing an integral of a detected value over time with a threshold value. For example, the stall detector is configured to evaluate an electrical current of the motor as the detected value and compare this detected current with a threshold current. If the detected electrical current exceeds the allowable threshold value, this is interpreted as a stall condition. It should be noted that the grinding of coffee beans is a rather irregular process wherein the torque distribution heavily fluctuates depending on the instantaneous load of coffee beans and orientation of the coffee beans in the grinder. Thus, instead of or in addition to evaluating a detected value, an average or integral value over a predetermined period of time can be evaluated to reliably determine the stall condition.

In an embodiment, the reversal unit is configured to reverse the direction of rotation of the grinding tool and/or of the motor for a predetermined angle and/or time. An advantage of this embodiment is that limiting the reverse rotation of the grinding tool and/or of the motor can prevent the grinding tool from reaching a second stall condition in reverse direction.

In an embodiment, the reversal unit is configured to reverse the direction of rotation of the grinding tool and/or of the motor with a predetermined rotational velocity. The rotational velocity of the grinding tool and/or of the motor in reverse can be the same or different than the rotational velocity in the preferred direction of rotation. The rotational velocity in a preferred direction of rotation is optimized for a desired grinding performance. However, in reverse operation, the rotational velocity can be set to a predetermined value which is optimized for causing a reorientation of the coffee beans in the grinder to overcome the stall condition. A first option is to slowly increase the rotational in reverse direction to avoid an abrupt change of the rotational velocity. This may reduce stress. Alternatively, a high rotational velocity is used during reversal in order to quickly rearrange the coffee beans.

In an embodiment, the reversal unit is configured to control a rocking motion of the grinding tool and/or of the motor by repeatedly changing the direction of rotation. An advantage of this embodiment is that a rocking motion has a positive effect on the rearrangement of coffee beans to overcome the stall condition. In contrast to simply changing the direction of rotation only once, the coffee beans are rearranged a plurality of times. Alternatively, going back and forth a plurality of times causes a type of repeated hammering motion which loosens the stall condition. The hammering overcomes the stall condition with the additional momentum provided each time the grinding tool hammers against the jammed region.

In an embodiment, the reversal unit is configured to evaluate a time interval between two events wherein the stall detector detects the stall condition and to adapt the reversal unit according to said evaluation. For a non-severe stall condition, it can be sufficient to perform a short counter-rotation. However, if a time interval between two events wherein the stall detector detects a stall condition is short, this can indicate a more severe blocking of the grinder, such that the reversal unit has to react accordingly.

In a further refinement, the reversal unit is further configured to control a rocking motion of the grinding tool and/or of the motor if the time interval is below a threshold value. An advantage of this embodiment is that the reversal unit can adaptively perform an appropriate reversal of a direction of rotation of the grinding tool and of the motor depending on the severity of the stall condition. For example, the reversal unit is configured to perform a single reversal of the direction of rotation of the grinding tool and/or of the motor when the stall detector detects a first stall condition. However, if a second stall condition is detected within a short time interval, the reversal unit is configured to perform a rocking motion of the grinding tool and/or or the motor.

In an embodiment, the grinding tool has an abrasive surface and the coffee grinder further comprises a bean delimiting tool for putting the coffee beans and the grinding tool in a position for contacting each other, the bean delimiting tool having a surface for retaining the coffee beans in such a position and wherein the motor for driving the grinding tool is configured for realizing a relative movement of the coffee beans and the abrasive surface. An advantage of this embodiment is that it is possible to use only one grinding tool having an abrasive surface, and that such a grinding tool can be driven at a relatively high speed and a relatively low torque, so that a relatively small drive motor can be applied and it is possible to use a small gearbox for realizing a low transmission ratio, for example 1:5 or 1:7, or even to avoid the application of a gearbox between motor and grinding tool.

In a further refinement, the grinding tool (20) is rotatable arranged in the coffee grinder and wherein the motor for realizing a relative movement of the coffee beans and abrasive surface is adapted to rotate the grinding tool at a speed which is at least 500 revolutions per minute, preferably at least 1000 revolutions per minute. In that case, a relatively light and small motor can be used in the grinder, and the grinding tool can optionally be driven directly by the motor without the application of a gearbox, while it is still possible to have an effective grinding process.

In an embodiment, the coffee grinder further comprises a clutch arranged between the motor and the grinding tool, the clutch comprising a first clutch element and a second clutch element, wherein the first clutch element is configured for a rotational movement with respect to the second clutch element upon a rotation by the motor for a limited angle of rotation until, upon reaching a stop, the first clutch element and the second clutch element rotate together. In other words, the motor for driving the grinding tool and the grinding tool are not rigidly coupled with respect to each other. They can be rotated with respect to each other for a limited angle. This limitation of the free rotational movement with respect to each other applies at least in the preferred direction of rotation. Advantageously, the first clutch element comprises a first contact surface and the second clutch element comprises a second contact surface which contact each other upon reaching the limit of the free rotational movement. Thus the contact surfaces act as a stop. The stop can be a mechanical stop, end stop, bedstop or block. Optionally, the clutch is a spring-loaded clutch as described above.

In a refinement, the clutch further comprises a spring element for causing a rotational movement of the first clutch element with respect to the second clutch element. Thus, the first clutch element can be mechanically rotated with respect to the second clutch element. An advantage of this embodiment is that simpler control electronics can be used since the motor only has to be driven electrically in one direction of rotation i.e. the preferred direction of rotation used for grinding.

In a refinement, the reversal unit is configured to perform the steps of temporarily reversing the direction of rotation of the motor, wherein the first clutch element performs a free rotational movement with respect to the second clutch element, resuming the preferred direction of rotation of the motor, wherein the first clutch element performs a free rotational movement with respect to the second clutch element in an opposite direction of rotation, and hammering the first clutch element against the second clutch element upon reaching the limit of the free rotational movement. The free rotation of the motor before having to drive the grinding tool enables the motor to gain angular momentum. Thus the motor needs less torque during startup. Furthermore, this angular momentum of the motor provides the extra energy needed for starting a rotation of the grinding tool, in particular for overcoming the stall condition of the grinding tool.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
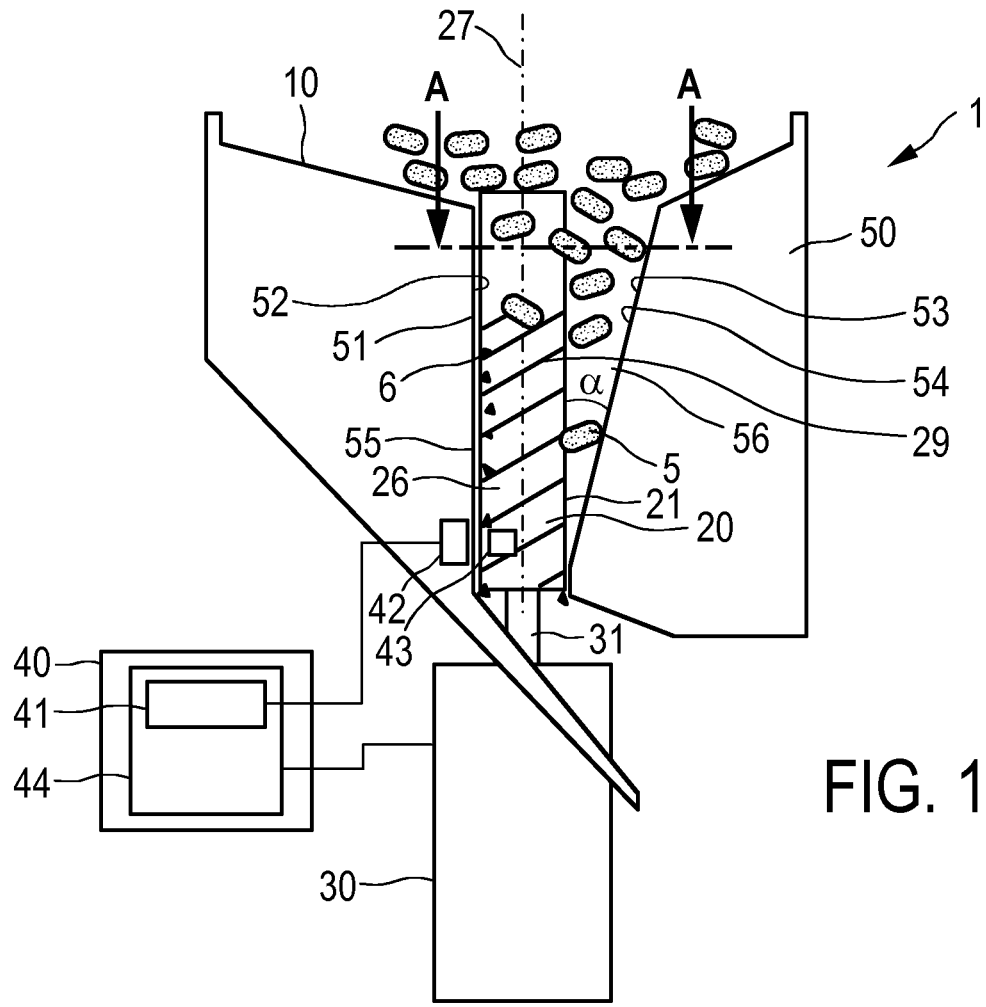
FIG. 1 shows an exemplary embodiment of a coffee grinder according to an aspect of the present invention.

FIG. 1 shows an exemplary embodiment of a coffee grinder 1. The coffee grinder 1 comprises a grinding tool 20 for grinding coffee beans, a motor 30 for driving the grinding tool 20, a stall detector 41 for detecting a stall condition of the grinding tool 20 and/or of the motor 30, and a reversal unit 40 configured to temporarily reverse a direction of rotation of the grinding tool 20 and/or of the motor 30 if the stall detector 41 detects a stall condition, as the basic components.

A coffee grinder 1 is a device for grinding coffee beans 5, which are diagrammatically shown in FIG. 1 as ellipses. By grinding the coffee beans 5, coffee powder or coffee grind is formed, which is suitable to be used in a process of making coffee by allowing a quantity of water to interact with the coffee grind, so that the soluble part of the coffee grind is extracted. The coffee grinder 1 can also be fed with coarse coffee grind. The coffee grinder 1 can be an integral part of a coffee maker or alternatively a standalone device.

Referring again to FIG. 1, the grinder 1 comprises a reservoir 10 for containing a plurality of coffee beans 5. For the purpose of performing a grinding action on the coffee beans 5, a grinding tool 20 having an abrasive surface 21 is provided. In the shown example, the grinding tool 20 comprises a cylinder-shaped portion 26 having a circular circumference, which is rotatable about a longitudinal axis 27, which axis 27 has a substantially vertical orientation in the shown example. A direction of a rotation movement of the grinding tool 20 about the longitudinal axis 27 of the cylinder-shaped portion 26, which is performed by the grinding tool 20 during a grinding process, is indicated by means of an arrow 28 in FIG. 2. The arrow 28 denotes the preferred direction of rotation for grinding coffee beans. The arrow 28' denotes the opposite or reverse direction of rotation. The abrasive surface 21 is present at the curved cylinder wall of the cylinder-shaped portion 26. In the non-limiting example shown herein at one end of the cylinder-shaped portion 26, the grinding tool 20 is directly connected to a drive shaft 31 of a motor 30.

Besides the grinding tool 20, the grinder 1 comprises a housing 50 for encompassing the cylinder-shaped portion 26 of the grinding tool 20. The housing 50 has a grinding chamber 51 for allowing the grinding tool 20 to extend inside the housing 50. In the shown example, the housing 50 is arranged right underneath the reservoir 10, so that the coffee beans 5 can be transported directly from the reservoir 10 to the grinding chamber 51.

The grinding chamber 51 is shaped like an asymmetric funnel, wherein an opening with the largest dimension is present at the top, and wherein an opening with the smallest dimension is present at the bottom. As seen in the sectional view taken in a vertical direction, one area 52 of a surface 53 of the housing 50 delimiting the grinding chamber 50, which surface 53 will hereinafter be referred to as delimiting surface 53, extends in a substantially vertical direction, i.e., a direction parallel to the longitudinal axis 27 of the cylinder-shaped portion 26 of the grinding tool 20 in the shown example, and another area 54 of the delimiting surface 53 is inclined with respect to the longitudinal axis 27, thereby being non-parallel to the longitudinal axis 27 as mentioned, as illustrated in FIG. 1. For example, an angle α between the inclined area 54 and the longitudinal axis 27 may be about 15°. The cylinder-shaped portion 26 of the grinding tool 20 is arranged such as to extend near the vertical area 52, so that a small gap 55 is present between the abrasive surface 21 and the area 52, and a larger gap 56 which gradually gets smaller in a downward direction is present around a major part of the cylinder-shaped portion 26 of the grinding tool 20. Unlike the surface 21 of the grinding tool 20, the delimiting surface 53 does not need to have abrasive properties, so that it can have a smooth appearance instead.

Figure 2:
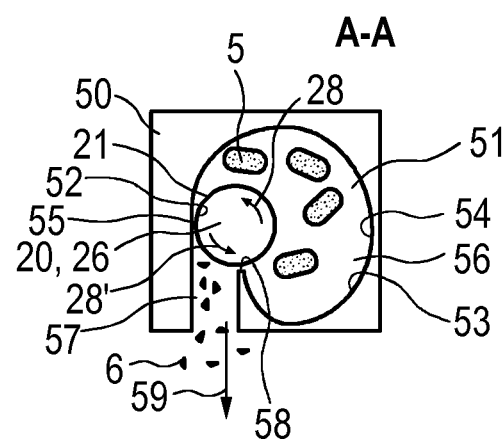
FIG. 2 shows a section as taken along line A-A in FIG. 1.

FIG. 2 illustrates the fact that an outlet 57 for letting out coffee grind or bean particles which are obtained as a result of the grinding process preferably has a tangential orientation with respect to the circumference of the cylinder-shaped portion 26 of the grinding tool 20. Advantageously, a height (that is the dimension parallel to the longitudinal axis 27) of the outlet 57 is more or less the same as the height of the cylinder-shaped portion 26 of the grinding tool 20, so that bean particles can be removed from the grinding chamber 51 at any level, wherein accumulation of coffee grind in a bottom portion of the grinding chamber 51 is prevented. In order to prevent the coffee beans 5 from reaching the outlet 57 without being taken along with the grinding tool 20 as it rotates and without being ground at all, the delimiting surface 53 comprises another vertical area 58 for facing the abrasive surface 21 at a close distance.

In an alternative embodiment, the coffee grinder 1 comprises a burr grinder, wherein a grinding burr acts as the grinding tool 20 for grinding coffee beans. A burr grinder typically comprises a second, static burr instead of the delimiting surface 53. Thus, the coffee beans 5 are crushed or cracked between two grinding burrs. It should be noted that coffee beans may also get cracked in the embodiment shown in FIG. 1, for example between the grinding tool 20 and a wall of the grinding chamber 51.

An essential difference between burr grinders and the grinder shown in FIG. 1 is that in burr grinders the coffee beans 5 are supplied to a gap which is present between two grinding burrs, while in the coffee grinder 1 shown in FIG. 1 coffee beans 5 are made to contact the abrasive surface 21 of the grinding tool 20 by letting them move downwards in a funnel-shaped grinding chamber 51 in which the grinding tool 20 is arranged. At a certain point, a coffee bean 5 is wedged between the abrasive surface 21 and the delimiting surface 53, wherein a bit of the coffee bean 5 is ground of due to the fact that the abrasive surface 21 moves with respect to the coffee bean 5. With every bit that is removed in this way, the coffee bean 5 moves further down. It is advantageous if the abrasive surface 21 has a spiraling texture 29 as shown in FIG. 1, as such a texture 29 can have a function in grabbing the beans 5 and facilitating the desired downward movement of the beans 5. Eventually, as a result of the grinding process, a bean 5 is divided in numerous fragments 6, which are diagrammatically shown in FIGS. 1 and 2 as small triangles. The size of the coffee beans 5 can also be reduced bit by bit, thus producing coarse grind as an intermediate product and then a final grind of a desired particle size. When the fragments 6 are small enough to pass between the abrasive surface 21 and the vertical area 52 of the delimiting surface 53, the fragments 6 exit the grinding chamber 51 and enter the outlet 57. For sake of clarity, a direction in which the fragments 6 subsequently move through the outlet 57 is indicated by means of an arrow 59 in FIG. 2.

In the following, the functioning of the grinder 1 is further explained. At the start of the grinding process, the motor 30 is activated so that the grinding tool 20 performs a rotation movement about the longitudinal axis 27 of the cylinder-shaped portion 26. The speed of rotation is preferably in a range of 500 to 5,000 revolutions per minute, wherein it is even more preferred if the speed of rotation is in a range of 1,000 to 2,500 revolutions per minute, while the torque is preferably at most 2 Nm, wherein it is more preferred to have a torque of 1 Nm, and even more preferred to have a torque of at most 0.2 Nm. A coffee bean 5 which is supplied from the reservoir 10 to the grinding chamber 51 is received between the abrasive surface 21 and the delimiting surface 53. As a result of the contact between the coffee bean 5 and the moving abrasive surface 21, the coffee bean is ground. As the coffee bean gets smaller, it gradually moves in a downward direction, while more and more of the coffee bean 5 is removed, and the process is continued until a last reminder of the coffee bean 5 is so small that it can escape between the delimiting surface 53 and the abrasive surface 21. Hence, similar to the separation of burrs in a burr grinder, the size of the small gap 55 between the abrasive surface 21 and the vertical area 52 of the delimiting surface 53 is a determining factor in respect of the size of the largest particles in the coffee grind which is obtained as a result of the grinding process. Consequently, adjustment of the grind size can be achieved through adjustment of the size of the small gap 55.

Basically, the grinding process to be performed by means of the grinder 1 involves a rotation movement of the grinding tool 20 and a gradual movement of the coffee beans 5 from the widest part to the narrowest part of the funnel-shaped grinding chamber 51, wherein bean fragments 6 are obtained which are small enough to exit the grinding chamber 51 at the position of the outlet 57.

For sake of completeness, it is noted that the grinder 1 may have another orientation than the orientation shown in FIG. 1, wherein the grinding tool 20 is arranged in a vertical direction. For example, the grinding tool 20 can be arranged in a horizontal direction underneath a bean reservoir 10 such that coffee beans 5 enter the grinding chamber 51 from a side of the grinding tool 20. An advantage of a horizontal orientation is that the supply of coffee beans 5 can take place in a radial direction, and a build height of the grinder can be reduced.

An advantage of the coffee grinder 1 as exemplarily shown in FIGS. 1 and 2 is that the grinding of coffee beans can take place at high speed with low torque, so that it is possible to apply a relatively inexpensive electromotor 30 and to choose optimum settings for such a motor, wherein there is only a need for a small gearing or gear box, or even no need at all for a gear box, such that space is saved, costs are reduced and (energy) efficiency is increased.

In general, a grinder should be as light, small and low-cost as possible. A problem involved when using a light, small motor 30 to drive the grinding tool 20 is that the power and torque delivered by the motor are limited. Since power is torque times rotation rate, a limitation of power and high rotation rate of the grinding tool 20 also mean that the torque that is available to drive the grinding tool 20 is limited. Thus, coffee beans 5 which get stuck between the abrasive surface 21 and the delimiting surface 53 can block the coffee grinder 1 and lead to a stall condition.

It should be noted that the problem of stalling is seldom encountered in conventional burr grinders, since conventional burr grinders typically have a high gear ratio of, for example, 1:40 between the motor and the grinding tool. A high gear ratio translates the limited torque of the motor to a high torque at the grinding tool. A high torque at the grinding tool can be sufficient to prevent a stall condition.

Not only the torque but also a probability distribution of the torque required to drive the grinding tool 20 for grinding coffee beans significantly depends on the size of the coffee grinder. A large coffee grinder, for example a conventional burr grinder, features a rather steady torque distribution since a multitude of coffee beans is present in the grinder which has an averaging effect on the torque required to operate the grinding tool. However, for example for a small high speed grinder, a smaller number of coffee beans are present in the grinder such that the averaging effect is reduced. Thus, the torque distribution exhibits a larger variability. This effect is similar to the standard deviation of a Gaussian distribution wherein the standard deviation does not increase linearly with the number of events but scales with the square root of the number of events.

The inventors have thus found that the torque during the grinding process is highly variable, depending on the amount of coffee grind in the device, the distribution of the grinds and the required grinding degree. The peak torques are significantly higher than average torque. Practical values are 1.2 Nm peak torque and 0.4 Nm average torque. For an exemplary rotation rate of 1,500 revolutions per minutes of the grinding tool and a gearing ratio of 1:7, the mechanical power is of the order of 80 W.

Experiments have shown that the distribution of chances that a certain torque occurs for a limited amount of coffee beans is exponentially decaying, such that the chance of stall at a 0.3 Nm higher torque is 0.001 lower. Thus, assuming such an exponential decay, the torque to drive the grinding tool would have to be increased, for example, by 1.4 Nm from 1.2 Nm to 2.6 Nm in order to reduce the probability that a stall condition occurs during the device lifetime to an acceptable low value. However, this would require a larger, heavier and/or potentially more expensive strong motor or alternatively a gearing with a sufficiently high gear ratio.

As a solution, the inventors have found that temporarily reversing a direction of rotation of the grinding tool and/or of the motor can overcome a stall condition wherein the coffee grinder is blocked by jammed beans. A temporary reversal of the grinding tool causes a redistribution of the ground coffee in the device which is sufficient to overcome the particular configuration that led to stalling. It should be noted that it is not necessary to completely empty the coffee grinder. The coffee grinder can resume its regular operation after the temporary reversal.

Referring again to FIG. 1, the coffee grinder 1 comprises a stall detector 41 for detecting a stall condition of the grinding tool 20 and/or of the motor 30. In the embodiment shown in FIG. 1, the stall detector 41 is connected to a sensor 42 which is configured to sense a rotation rate of the grinding tool 20. The sensor 42 can be a Hall sensor for detecting revolutions of the grinding tool 20. For this purpose, the grinding tool 20 comprises a magnet 43. Alternative sensors for detecting a stall condition of the grinding tool 20 and/or of the motor 30 are within the scope of the present invention. Alternatively, a current of the motor 30 can be evaluated for detecting a stall condition of the motor 30. Further alternatively, frequency components of the supply of the motor 30 can be evaluated to determine a rotation rate of the motor 30, for example current spikes induced by commutator switching. Further alternatively, a torque metering device can be employed.

In the embodiment shown in FIG. 1, the reversal unit 40 is implemented as an electronic reversal unit which comprises a controller 44 for controlling a direction of rotation of the motor 30. Optionally, the stall detector 41 is co-integrated with the controller 44. In an alternative embodiment, the stall detector 42 is implemented as a separate unit. If the stall detector 41 detects a stall condition of the grinding tool 20 and/or of the motor 30, the reversal unit 40 is configured to temporarily reverse a direction of rotation of the grinding tool 20 and of the motor 30. Thus, the preferred direction of rotation, indicated by arrow 28 in FIG. 2, is temporarily reversed as indicated by arrow 28' in FIG. 2. This is also shown in FIG. 3, wherein positive torque values on the vertical axis indicate a rotation in the preferred direction of rotation whereas negative torque values indicate a rotation in the reverse direction of rotation 28'.

Figure 3:
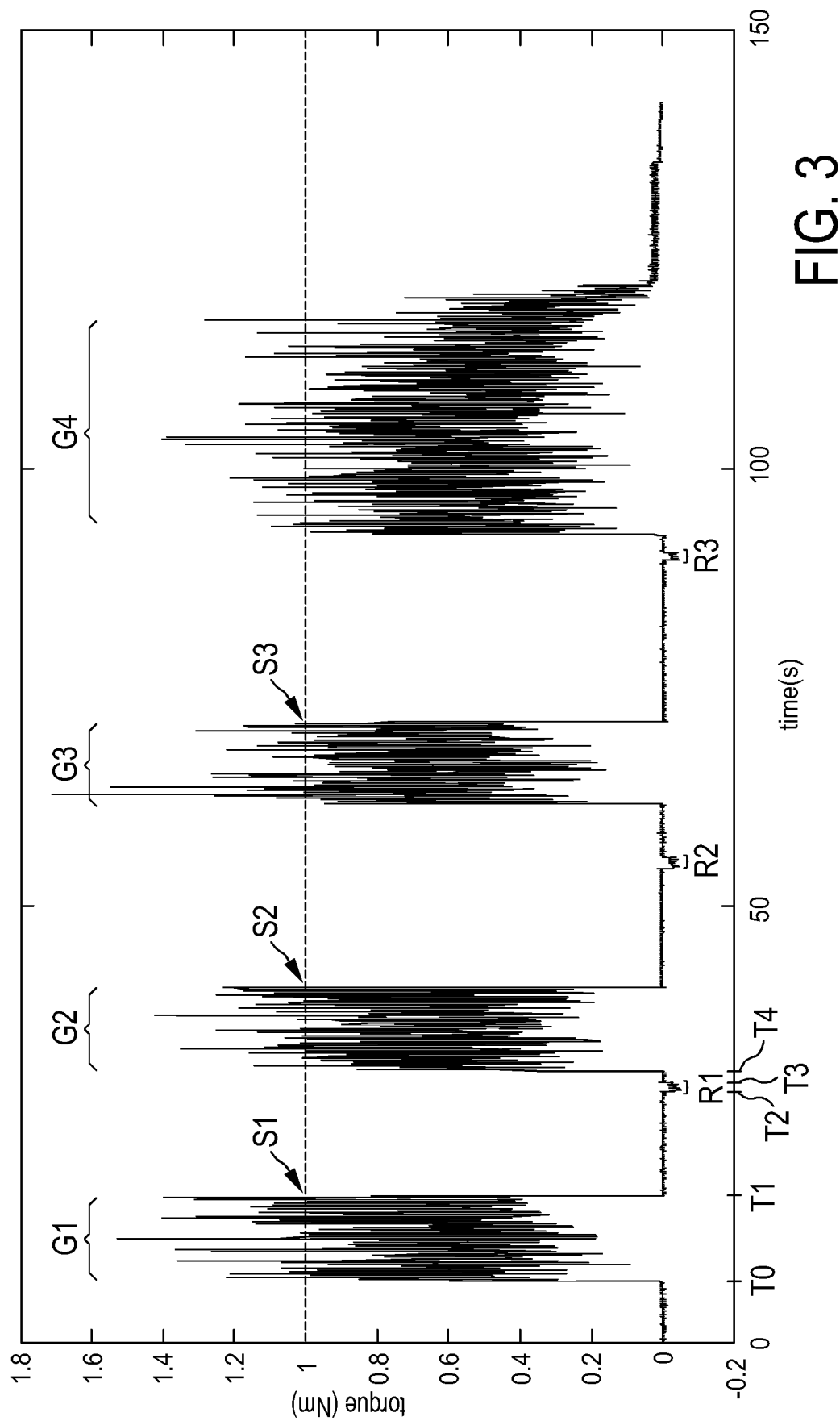
FIG. 3 shows a graph of a torque to drive a grinding tool versus time.

FIG. 3 shows a graph of the torque required to drive the grinding tool 20. The vertical axis denotes the torque, whereas the horizontal axis denotes the time. The graph in FIG. 3 shows the measured torque for four intervals G1, G2, G3, G4 of regular operation of the grinding tool 20 in the preferred direction of rotation, three stalling events S1, S2, S3, and three times reversing the direction of rotation of the grinding tool 20 denoted by R1, R2, R3. Interval G4 shows a full recovery without stalling. In this experiment, the motor is configured to stall very quickly at a torque of about 1 Nm for a predetermined amount of time. Thus, temporary spikes of the torque are tolerated. Advantageously an integral of the detected torque over time is compared with a threshold value for detecting the stall condition. In this embodiment, the reversal unit is configured to reverse the direction of rotation of the grinding tool 20 for a predetermined amount of time.

As can be seen from the experimental data in FIG. 3, the torque during reverse operation R1, R2, R3, wherein the direction of rotation of the grinding tool 20 is reversed, is significantly lower than the torque during operation of the grinding tool 20 in the preferred direction of rotation for grinding G1, G2, G3, G4. Thus, also a small, compact and inexpensive motor 30 can overcome a stall condition by temporarily reversing the direction of rotation.

In FIG. 3, the grinding process starts at time T0 where the controller 44 controls the direction of rotation of the motor 30 in the preferred direction of rotation 28. The first grinding period G1 lasts from T0 until T1, when the stall detector 41 detects the stall condition S1. Upon detecting the stall condition S1, the controller 44 pauses the motor 30. An advantage of pausing the motor after detecting a stall condition is that this allows the motor 30 to cool down. After a predetermined amount of time, the controller 44 is configured to initiate a reverse rotation of the motor 30 and thus of the grinding tool 20. The reversal is indicated by an interval R1 which lasts from T2 until T3. As can be seen in the graph in FIG. 3, the required torque during a reversal R1 is much lower than the torque required during grinding operation G1. The reverse rotation of the motor 30 is stopped at T3 and paused until resuming operation in the preferred direction of rotation at time T4.

Alternatively, instead of performing a single temporary reversal as shown in FIG. 3, the reversal unit 40 can be configured to control a rocking motion of the grinding tool 20 and/or of the motor 30 by repeatedly changing the direction of rotation, thus switching between the preferred direction of rotation indicated by arrow 28 in FIG. 2 and the reverse direction of rotation indicated by 28' in FIG. 2.

As an alternative to electrically reversing the direction of rotation of the grinding tool 20 and/or the motor 30, the reversal unit can be implemented as a mechanical solution for temporarily reversing a direction of rotation of the grinding tool 20 and/or of the motor 30. For example, the reversal unit can be implemented as a gear box between motor 30 and grinding tool 20 which gear box comprises a forward gear and a reverse gear.

As an alternative to a sophisticated gear box, a less expensive and more compact mechanical solution can be implemented in form of clutch, in particular a spring-loaded clutch.

In a first embodiment, the drive shaft 31 between the motor 30 and the grinding tool 20 in FIG. 1 is replaced by a torsion spring 45. The controller 44 starts a rotation of the motor 30 in a preferred direction of rotation. The torsion spring 45 winds up and transmits the rotational movement of the motor 30 to the grinding tool 20. If the grinding tool 20 is blocked, this can be detected by the stall detector 41 via the sensor 42. The controller 44 then shuts off the power of the motor 30. The energy stored in the torsion spring 45 then releases by causing a temporary reversal of the direction of rotation of the motor 30. Furthermore, if the motor gains sufficient momentum in the reverse direction of rotation, the motor can wind the spring up in the reverse direction to some extent, which causes a 'pull' in reverse direction on the grinding tool. The extent to which this occurs depends on the spring constant, inertia of the motor and friction. This can be described as a mass-spring system, which can be under-damped, critically damped, or over-damped. Eventually, this effect can cause a temporary reversal of the direction of rotation of the grinding tool. Whether this 'overshoot' causes a temporary reversal of the direction of rotation of the grinding tool due to the pull in reverse direction of rotation depends on the friction between tool and beans. However, as illustrated in FIG. 3, the torque required to drive the grinding tool in reverse direction is low.

Figure 4A:
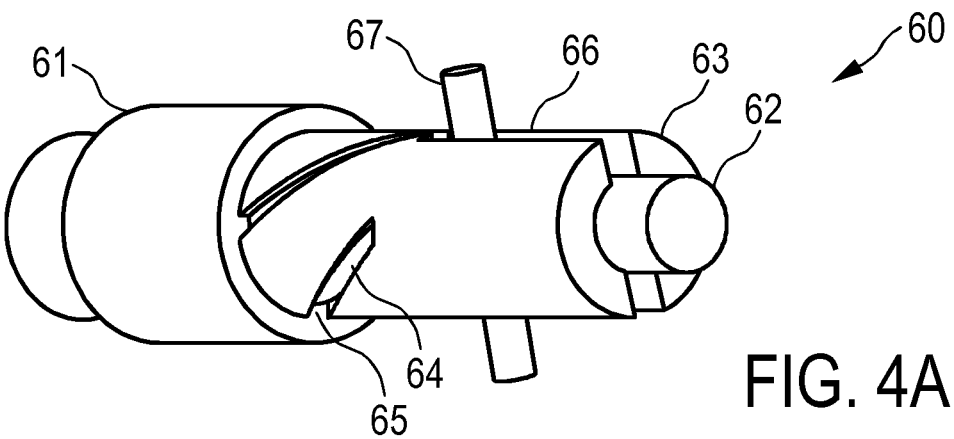
FIGS. 4A to 4C show an embodiment of a reversal unit comprising a spring-loaded clutch.
Figure 4B:
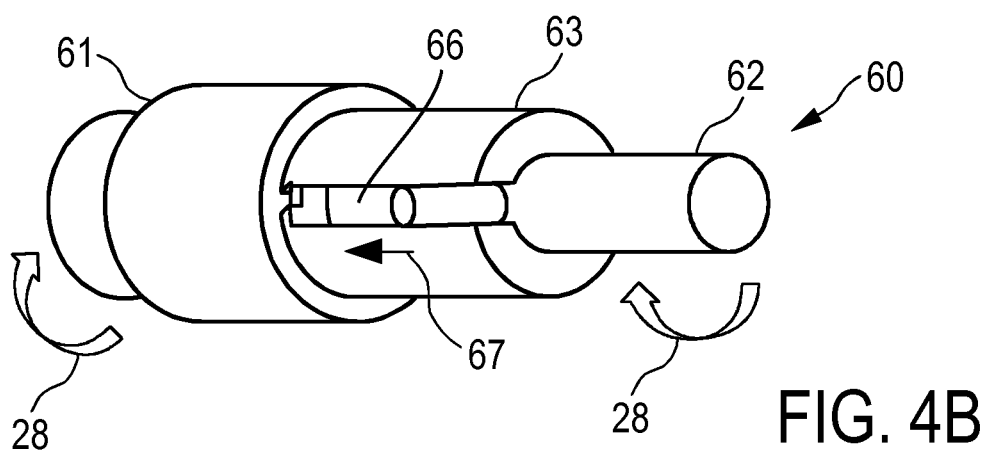
Figure 4C:
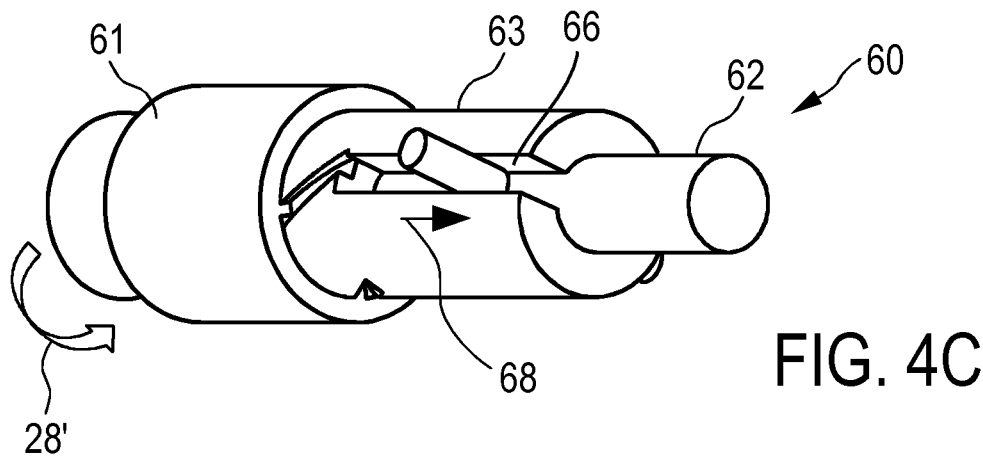

FIGS. 4A to 4C illustrate an alternative embodiment of a spring-loaded clutch which can be implemented between the motor 30 and the grinding tool 20, between the motor 30 and an optional gear box or between the optional gear box and the grinding tool 20.

FIG. 4A shows a spring-loaded clutch 60 comprising a drive shaft 61 for connection to the motor 30, a driven shaft 62 for connection to the grinding tool 20, and a central clutch sector 63 between the drive shaft 61 and the driven shaft 62. The central clutch sector 63 comprises a groove, in particular a spiral groove 64, for guiding a protrusion 65 of the drive shaft 61. Thus, the drive shaft 61, as a first clutch element, is configured for a rotational movement with respect to the central clutch sector 63, as a second clutch element, upon rotation of the motor 30 for a limited angle of rotation. Upon reaching the end of the spiral groove 64, as a stop or block, the drive shaft 61 and the central clutch sector 63 and thereby also the driven shaft 62 rotate together. The central clutch sector 63 further comprises a slit 66 extending in a longitudinal direction of an axis extending from the drive shaft 61 to the driven shaft 62 for receiving and engaging with a crossbar 67 of the driven shaft 62.

FIG. 4A shows the spring-loaded clutch 60 in a relaxed state. The relaxed state occurs when neither the drive shaft nor the driven shaft is turning or also during free-wheeling when there is no load to be driven, i.e. when there are no coffee beans present in the grinder.

FIG. 4B shows the spring-loaded clutch 60 during grinding operation. Both the drive shaft 61 as well as the driven shaft 62 are turning in the preferred direction of rotation indicated by arrows 28. The transition from relax state, as shown in FIG. 4A, to the loaded state shown in FIG. 4B occurs when there is a resistance, i.e., coffee beans to be ground, acting on the driven shaft 62 which initially holds the driven shaft 62 in place, while the motor 30 starts to turn the drive shaft 61 in direction 28. At startup, the protrusions 65 are guided along the spiral grooves of the central clutch sector 63 and the central clutch sector 63 moves towards the drive shaft 61 as indicated by arrow 67. Inside the central clutch sector 63 is an optional spring which exerts a force opposing the movement 67 and thus tries to push the central clutch sector 63 away from the drive shaft 61. In other words, the central clutch sector 63 moves axially when there is a difference in rotation rate of the drive shaft 61 and the driven shaft 62 and compresses a spring, wherein the spring can exert an axial and/or a tangential force. Upon the protrusions 65 reaching the end of the spiral groove 64, the drive shaft 61 starts to rotate the central clutch sector 63 and thereby the driven shaft 62 in the preferred direction of rotation 28. An advantage of this embodiment is that during this startup phase while the drive shaft is guided in the spiral groove 64, the motor does not have to turn the grinding tool 20 connected to the driven shaft 62. Thus, the motor experiences a low resistance. The resistance is set by the spring of the clutch 60. Thereby, the drive shaft 61 and the motor 30 can increase their rotational speed and gain momentum. Upon reaching the end of the spiral groove 64, this momentum can be transferred to the driven shaft 62 and cause a torque spike. This torque spike can provide sufficient torque to overcome a stall condition in order to free the grinder. This initial torque spike can also be referred to as a hammering impulse.

FIG. 4C shows the spring-loaded clutch 60 acting as a mechanical reversal unit. Upon detecting a stall condition of the grinding tool 20 and/or of the motor 30, the rotation of the driven shaft 62 stops and the power of the motor 30 is cut off. The energy stored in the spring in the central clutch sector 63 then retracts the central clutch sector 63 with respect to the driven shaft 62 in direction indicated by arrow 68. If the driven shaft 62 is held in place, for example by a stall of the grinding tool 20, this movement in direction 68 of the central clutch sector 63 forces the drive shaft in a temporary reverse rotation indicated by arrow 28' by the protrusions 65 along the spiral groove 64 of the central clutch sector 63. In this embodiment, the central clutch sector 63 does not rotate since the central clutch sector 63 is guided along the slit 66 wherein the crossbar 67 of the blocked driven shaft 62 prevents a rotation.

Figure 5A:
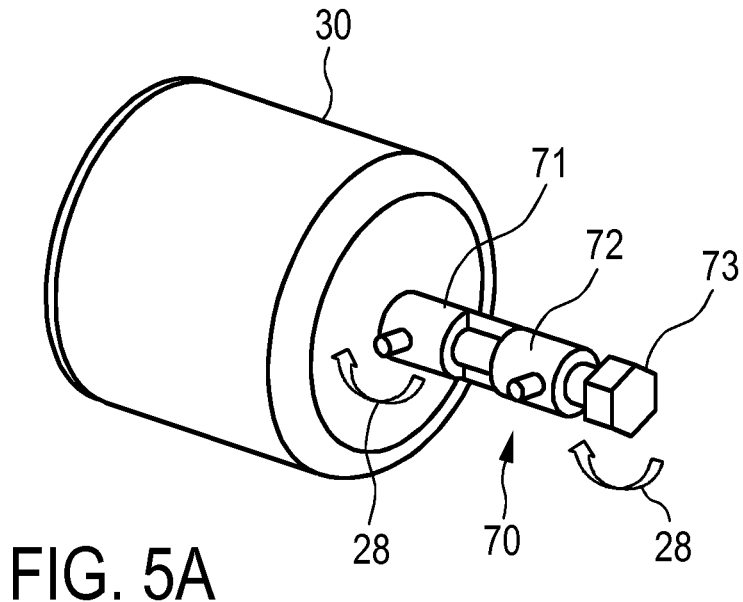
FIGS. 5A to 5C show an alternative embodiment of a clutch.
Figure 5B:
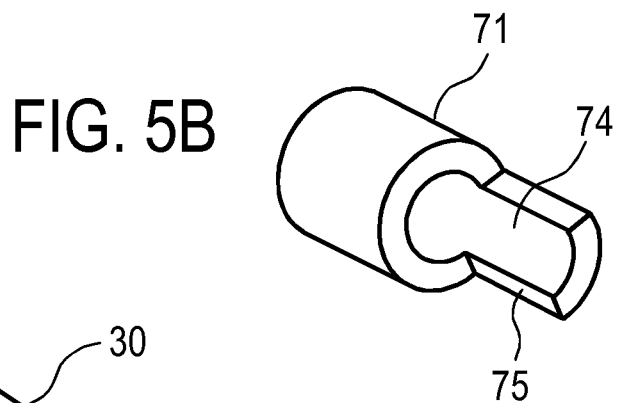
Figure 5C:
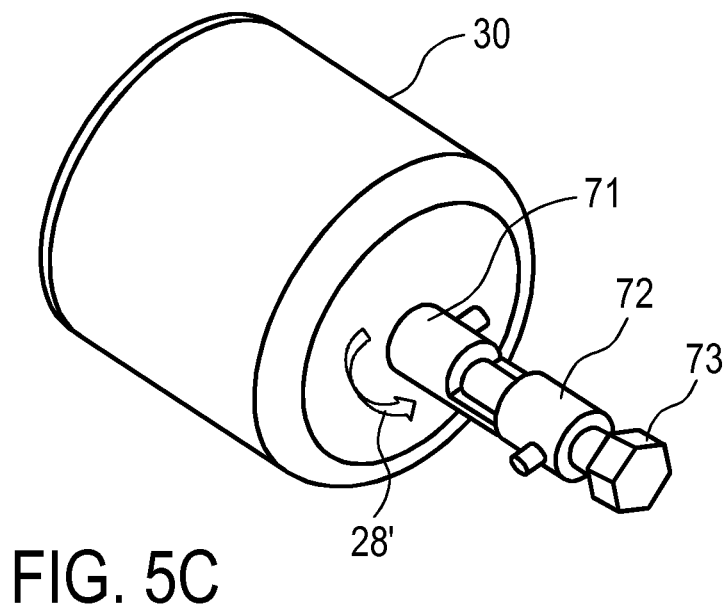

FIGS. 5A to 5C illustrate a further embodiment, wherein the drive shaft 31 between motor 30 and grinding tool 20 as shown in FIG. 1 is replaced by a clutch, in particular a spring-loaded clutch 70. The spring-loaded clutch 70 comprises a clutch driver 71 and a driven clutch 72 which is coupled to the driven shaft 73 for driving the grinding tool 20.

FIG. 5A shows the spring-loaded clutch 70 during operation, wherein the clutch driver 71 and the driven clutch 72 both rotate in a preferred direction of rotation indicated by arrows 28. The clutch driver 71 is coupled to a drive shaft of the motor 30 that is configured to be rotatable for an angle of, for example, 180° with respect to the driven clutch 72.

FIG. 5B shows a magnification of the clutch driver 71. The clutch driver 71 in this embodiment comprises a driving pin 74 which, in this embodiment, covers a quarter circle or 90° of the tubular structure of the clutch driver 71. The driven clutch 72 has a complimentary structure such that a contact surface 75 of the clutch driver 71 can engage with a corresponding contact surface of the driven clutch 72. In operation, as shown in FIG. 5A, wherein the motor 30 drives the grinding tool 20, the contact surface 75 of the clutch driver 71 is in contact with the contact surface of the driven clutch 72 and thereby transfers energy from the motor 30 to the grinding tool 20. The contact surfaces act as a stop or block element for limiting the angle of rotation.

FIG. 5C illustrates the process after a stall condition of the grinding tool 20 has been detected and the motor has been shut down. If the grinding tool 20 is blocked, the drive shaft 73 and thus the driven clutch 72 come to a stop. Once the motor 30 is de-energized, and does not exert a force on the clutch driver 71 anymore, the elastic energy stored in the spring-loaded clutch 70 can turn back the clutch driver 71 of the motor 30. Thus, the spring-loaded clutch acts as a reversal unit for temporarily reversing the direction of rotation of the motor 30 as indicated by arrow 28' in FIG. 5C.

In an alternative embodiment of FIG. 5C, the clutch 70 does not comprise a spring for mechanically turning back the motor. Instead the reversal unit comprises a controller for controlling a direction of rotation of the motor 30. Thus, the direction of rotation of the motor can be reversed electrically.

Starting from the position of the clutch driver 71 and the driven clutch 72 shown in FIG. 5C, this enables the clutch driver 71 to perform a 180° free stroke on the driven clutch 72 in the preferred direction of rotation 28, opposite to the reverse direction of rotation indicated by arrow 28'. Thus, also in this embodiment, the motor can gain momentum to perform a hammering motion via the clutch driver 71 on the driven clutch 72 which can exert a high torque impulse on the grinding tool 20 in order to overcome the stall condition.

As the motor 30 starts to rotate—both before stall and after stall, when it has rewound—it winds up as spring inside the spring-loaded clutch 70. The elastic energy thus stored can be used to turn back the motor 30. In case of using a gear box, the clutch in this embodiment is preferably between the motor 30 and the gear box. An advantage of this embodiment is that the spring does not have to overcome friction of the gear box.

In other words, if the grinding tool 20 is rotating at a slower speed than the drive shaft and clutch driver 71 of the motor 30 both the spring winds up, and the motor gains angular momentum. The use of a hammering mechanism, i.e., two nocks (quarter bushes, driving pin 74 of the clutch driver 71 and its corresponding counterpart of the driven clutch 72) slamming against each other, allows the creation of a short, high torque, pulse mechanically, thus hammering through the stalling configuration. In this embodiment, brute force is used to recover from stalling, without turning back the grinding tool 20 by temporarily reversing a direction of rotation of the motor 30.

In conclusion, an aspect of the present invention relates to a coffee grinder which overcomes the problem of stalling while at the same time being light, small and/or less expensive as well as convenient to use. The coffee grinder comprises a grinding tool for grinding coffee beans, a motor for driving the grinding tool, a stall detector for detecting a stall condition of the grinding tool and/or of the motor, and a reversal unit configured to temporarily reverse a direction of rotation of the grinding tool and/or of the motor, if the stall detector detects a stall condition.

It should be noted that there is no limitation to a particular type of coffee grinder having these features. The concept is not limited to the particular embodiment of a coffee grinder shown in FIG. 1, but can also be used with different coffee grinders such as, for example, burr grinders. However, advantageously, the coffee grinder 1 is a device for grinding coffee beans 5 comprising a grinding tool 20 having an abrasive surface 21, a bean delimiting tool 50 for putting the coffee beans 5 and the grinding tool 20 in a position for contacting each other, the bean delimiting tool 50 having a surface 53 for retaining the coffee beans 5 in such a position and means for realizing a relative movement of the coffee beans and abrasive surface. Advantageously, the motor 30 drives the grinding tool for realizing the relative movement of the coffee beans and the abrasive surface.

Further advantageously, the surface 53 of the bean delimiting tool 50 is a non-abrasive surface.

Further advantageously, the grinding tool 20 is directly connected to an outgoing shaft 31 of the motor 30.

Further advantageously, the grinding tool 20 is rotatably arranged in the coffee grinder 1, and wherein the means for realizing a relative movement of the coffee beans 5 and abrasive surface 21 are adapted to rotate the grinding tool 20 at a speed which is at least 500 revolutions per minute.

Further advantageously, the means for realizing a relative movement of the coffee beans 5 and abrasive surface 21 are adapted to drive the grinding tool 20 at a typical torque which is at most 2 Nm.

Further advantageously, the coffee grinder 1 comprises a bean positioning unit defining a space for accommodating a coffee bean 5, the space being open to an area of the abrasive surface 21 of the grinding tool 20, wherein at least one of the grinding tool 20 and at least a component of the bean position unit is movably arranged in a first direction for varying a distance between the abrasive surface 21 and at least the component of the bean positioning unit, and wherein at least one of the grinding tool 20 and the bean positioning unit is movably arranged in a second direction which is different from the first direction, for varying areas of the abrasive surface 21 facing the open space of the bean positioning unit.

In a further refinement, the grinding tool 20 is rotatable about a central axis 27, and wherein the space of the bean positioning unit is open to a non-central area of the grinding tool 20.

In an further embodiment of the coffee grinder 1, at least a portion of the grinding tool 20 is shaped like a cylinder having a circular circumference, wherein the coffee grinder 1 further comprises a housing 50 having a grinding chamber 51, wherein the grinding tool 20 is accommodated inside the grinding chamber 51, and wherein the grinding chamber 51 is shaped like a funnel which is asymmetric with respect to a longitudinal axis 27 of the cylinder-shaped portion 26 of the grinding tool 20.

Further advantageously, at a position where the abrasive surface 21 of the grinding tool 20 is closest to a surface 53 of the housing 50 delimiting the grinding chamber 51, a gap between the abrasive surface 21 of the grinding tool 20 and the surface 53 of the housing 50 is at least 0.05 mm and at most 1 mm.

Further advantageously, the coffee grinder 1 comprises an outlet 57 for letting out coffee grind, which has a tangential orientation with respect to the circumference of the cylinder-shaped portion 26 of the grinding tool 20.

Correspondingly, a coffee grinding method is presented comprising the step of detecting a stall condition of a grinding tool for grinding coffee beans and/or of a motor for driving the grinding tool, and temporarily reversing a direction of rotation of the grinding tool and/or of the motor if the stall condition is detected.

In an advantageous refinement of this coffee grinding method, the coffee beans are ground off bit by bit by applying a coffee grinder 1 comprising two tools 20, 50, wherein one of the tools is a grinding tool 20 having an abrasive surface 21, wherein the coffee beans 5 and the abrasive surface 21 are made to contact each other to perform a relative movement with respect to each other, and wherein another of the tools is a bean delimiting tool 50 having a surface 53 against which the coffee beans 5 are retained during the time when they are in contact with the abrasive surface 21.

In an advantageous refinement, the grinding tool 20 is rotated at a speed which is at least 500 revolutions per minute.

In an advantageous refinement, the grinding tool 20 is driven at a typical torque which is at most 2 Nm.

In a further refinement, the coffee grind as obtained by grinding the coffee beans 5 is discharged from a position wherein the grinding tool 20 and the bean delimiting tool 50 by moving in the same direction as the grinding tool 20.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A coffee grinder comprising:
    a grinding tool for grinding coffee beans,
    a motor for driving the grinding tool,
    a stall detector for detecting a stall condition of the grinding tool and/or of the motor, and
    a reversal unit configured to:
        pause a rotation of the grinding tool and/or of the motor for a first predetermined amount of time when the stall detector detects the stall condition,
        after the first predetermined amount of time is over, reverse a direction of rotation of the grinding tool and/or of the motor for a second predetermined amount of time, and
        resume a preferred direction of rotation of the grinding tool and/or of the motor after the reversal of the direction of rotation is complete.

2. The coffee grinder according to claim 1, wherein the reversal unit comprises a controller for controlling a direction of rotation of the motor.

3. The coffee grinder according to claim 2, wherein the controller of the reversal unit is configured to:
    pause the reverse rotation of the grinding tool and/or of the motor.

4. The coffee grinder according to claim 2, wherein the controller of the reversal unit is configured to control a rocking motion of the grinding tool and/or of the motor by repeatedly changing the direction of rotation of the grinding tool and/or of the motor.

5. The coffee grinder according to claim 4, wherein the controller of the reversal unit is further configured to control the rocking motion in response to detecting another stall condition within a predetermined time interval.

6. The coffee grinder according to claim 1, wherein the reversal unit comprises a spring-loaded clutch.

7. The coffee grinder according to claim 1, wherein the stall detector is configured to evaluate an electrical current of the motor for detecting the stall condition.

8. The coffee grinder according to claim 7, wherein the evaluation comprises comparing a detected value with a threshold value and/or comparing an integral of a detected value over time with a threshold value.

9. The coffee grinder according to claim 1, wherein the stall detector is configured to evaluate a rotation rate of the grinding tool and/or of the motor for detecting the stall condition.

10. The coffee grinder according to claim 1, wherein the grinding tool has an abrasive surface, the coffee grinder further comprising a housing for putting the coffee beans and the grinding tool in a position for contacting each other, the housing having a surface for retaining the coffee beans in such a position, and wherein the motor is configured for performing a relative movement of the coffee beans and the abrasive surface.

11. The coffee grinder according to claim 10, wherein the grinding tool is rotatably arranged in the coffee grinder, and wherein the motor is adapted to rotate the grinding tool at a speed which is at least 500 revolutions per minute for performing the relative movement of the coffee beans and the abrasive surface.

12. The coffee grinder according to claim 1, further comprising a clutch arranged between the motor and the grinding tool, the clutch comprising a first clutch element and a second clutch element, wherein the first clutch element is configured for a rotational movement with respect to the second clutch element upon a rotation by the motor for a limited angle of rotation until, upon reaching a stop, the first clutch element and the second clutch element rotate together.

13. The coffee grinder according to claim 12, wherein the clutch further comprises a spring element for causing the rotational movement of the first clutch element with respect to the second clutch element.

14. A coffee machine comprising a coffee grinder according to claim 1.

15. A coffee grinding method comprising the steps of:
    detecting a stall condition of a grinding tool for grinding coffee beans and/or of a motor for driving the grinding tool,
    in response to detecting the stall condition, pausing a rotation of the grinding tool and/or of the motor for a first predetermined amount of time,
    after the first predetermined amount of time is over, reversing a direction of rotation of the grinding tool and/or of the motor for a second predetermined amount of time, and
    resuming a preferred direction of rotation of the grinding tool and/or of the motor after the reversal of the direction of rotation is complete.

* * * * *